(12) United States Patent
Yamashita

(10) Patent No.: US 11,781,887 B2
(45) Date of Patent: Oct. 10, 2023

(54) MONITORING CONTROL DEVICE AND MONITORING CONTROL METHOD

(71) Applicants: NISSAN MOTOR CO., LTD., Yokohama (JP); RENAULT S.A.S., Boulogne-Billancourt (FR)

(72) Inventor: Masanori Yamashita, Kanagawa (JP)

(73) Assignees: NISSAN MOTOR CO., LTD., Yokohama (JP); RENAULT S.A.S., Boulogne-Billancourt (FR)

(*) Notice: Subject to any disclaimer, the term of this patent is extended or adjusted under 35 U.S.C. 154(b) by 0 days.

(21) Appl. No.: 17/927,450

(22) PCT Filed: May 28, 2020

(86) PCT No.: PCT/IB2020/000513
§ 371 (c)(1),
(2) Date: Nov. 23, 2022

(87) PCT Pub. No.: WO2021/240191
PCT Pub. Date: Dec. 2, 2021

(65) Prior Publication Data
US 2023/0175871 A1 Jun. 8, 2023

(51) Int. Cl.
*G01D 3/08* (2006.01)
*G01D 5/244* (2006.01)
(Continued)

(52) U.S. Cl.
CPC ........... *G01D 5/24476* (2013.01); *G01D 3/08* (2013.01); *G01D 5/204* (2013.01); *H02P 29/024* (2013.01)

(58) Field of Classification Search
CPC ...... G01D 5/24476; G01D 3/08; G01D 5/204; H02P 29/024
See application file for complete search history.

(56) References Cited

U.S. PATENT DOCUMENTS 7,194,377 B1 * 3/2007 Saito .................... G01D 18/001
702/145
7,294,988 B2 * 11/2007 Ajima ...................... B60K 6/26
318/431
(Continued)

FOREIGN PATENT DOCUMENTS

CN     103166548 A        6/2013
CN     204263601 U   *    4/2015   ............. B30B 15/14
(Continued)

*Primary Examiner* — Tung S Lau
(74) *Attorney, Agent, or Firm* — Foley & Lardner LLP

(57) ABSTRACT

A monitoring control device for diagnosing a presence/absence of a detection failure of a rotation state of a rotator includes: a rotation sensor that detects the rotation state of the rotator and outputs an analog signal in response to the detected rotation state; a converter that calculates a first absolute angle of the rotator at a first timing based on the analog signal and outputs a signal including the first absolute angle; a first control device 10 that obtains the first absolute angle; and a second control device 20 that calculates a second absolute angle of the rotator at a second timing different from the first timing based on the analog signal. The first control device 10 generates a first diagnostic signal based on the first absolute angle, and outputs the first diagnostic signal to the second control device. The second control device generates a second diagnostic signal based on the second absolute angle, and compares the first diagnostic signal with the second diagnostic signal to diagnose the presence/absence of the detection failure of the rotation state.

5 Claims, 5 Drawing Sheets

(51) Int. Cl.
    *G01D 5/20*         (2006.01)
    *H02P 29/024*     (2016.01)

(56)           References Cited

U.S. PATENT DOCUMENTS

| | | | |
|---|---|---|---|
| 10,620,068 B2 * | 4/2020 | Jo | ................ B62D 15/0245 |
| 2008/0120055 A1 | 5/2008 | Cheng | |
| 2013/0151042 A1 | 6/2013 | Kim et al. | |
| 2018/0172486 A1 | 6/2018 | Zirkel et al. | |
| 2020/0254631 A1 | 8/2020 | Sawada et al. | |

FOREIGN PATENT DOCUMENTS

| | | | | |
|---|---|---|---|---|
| CN | 105774895 A | * | 7/2017 | ............... B62D 5/04 |
| CN | 108351225 A | | 7/2018 | |
| JP | 63-243702 A | | 10/1988 | |
| JP | 09-072758 A | | 3/1997 | |
| JP | 11-337372 A | | 12/1999 | |
| JP | 2000-039336 A | | 2/2000 | |
| JP | 2001-082981 A | | 3/2001 | |
| JP | 2003-042754 A | | 2/2003 | |
| JP | 2004-061157 A | | 2/2004 | |
| JP | 2007-315856 A | | 12/2007 | |
| JP | 2009-139096 A | | 6/2009 | |
| JP | 2012-098195 A | | 5/2012 | |
| JP | 2017-067695 A | | 4/2017 | |
| JP | 2018-128324 A | | 8/2018 | |
| JP | 2018-141656 A | | 9/2018 | |
| WO | WO 2009068695 A1 | * | 6/2009 | ......... B62D 15/0215 |

* cited by examiner

MONITORING CONTROL DEVICE AND MONITORING CONTROL METHOD

TECHNICAL FIELD

The present invention relates to a monitoring control device and a monitoring control method for diagnosing a presence/absence of a detection failure of a rotation state.

BACKGROUND ART

Conventionally, in a rotation angle detection device including a plurality of rotation angle sensor elements and a plurality of AD converters, there has been known a device configured to calculate a rotation angle at a reference timing in a breakdown of the AD converter (Patent Document 1). In this rotation angle detection device, the plurality of AD converters obtain cosine signals and sine signals analog-output from a plurality of rotation angle sensor elements corresponding to a rotation angle of a detection target, and sequentially convert them into cosine values and sine values as digital values at constant conversion cycles. At this time, AD conversion timings are synchronized among the plurality of AD converters. An angle calculation processing unit included in the rotation angle detection device calculates a plurality of angles interchangeable in the breakdown of the AD converter.
Patent Document 1: JP-A-2017-67695

DISCLOSURE OF THE INVENTION

Problems to be Solved by the Invention

However, in the above-described rotation angle detection device, there is a problem that the AD conversion timings need to be mutually synchronized among the plurality of AD converters.

An object of the present invention is to provide a monitoring control device and a monitoring control method capable of diagnosing a detection failure of a rotation state without need for synchronization of conversion timings of analog signals.

Solutions to the Problems

The present invention solves the above-described problem by: detecting a rotation state of a rotator and outputting an analog signal in response to the detected rotation state by a rotation sensor; calculating a first absolute angle of the rotator at a first timing based on the analog signal by a converter; generating a first diagnostic signal based on the first absolute angle by a first control device; calculating a second absolute angle of the rotator at a second timing different from the first timing based on the analog signal, generating a second diagnostic signal based on the second absolute angle, and comparing the first diagnostic signal with the second diagnostic signal to diagnose a presence/absence of a detection failure of the rotation state by a second control device.

Effects of the Invention

With the present invention, the detection failure of the rotation state can be diagnosed without need for the synchronization of the conversion timings of the analog signals.

DESCRIPTION OF PREFERRED EMBODIMENTS

The following describes a monitoring control device and a monitoring control method according to the embodiment of the present invention based on the drawings. In this embodiment, a description will be given with an example in which the monitoring control device is mounted to a vehicular drive system. The monitoring control device can be mounted to a system that drives a device including at least a rotator such as a motor, not limited to the vehicular drive system.

First Embodiment

Figure 1:
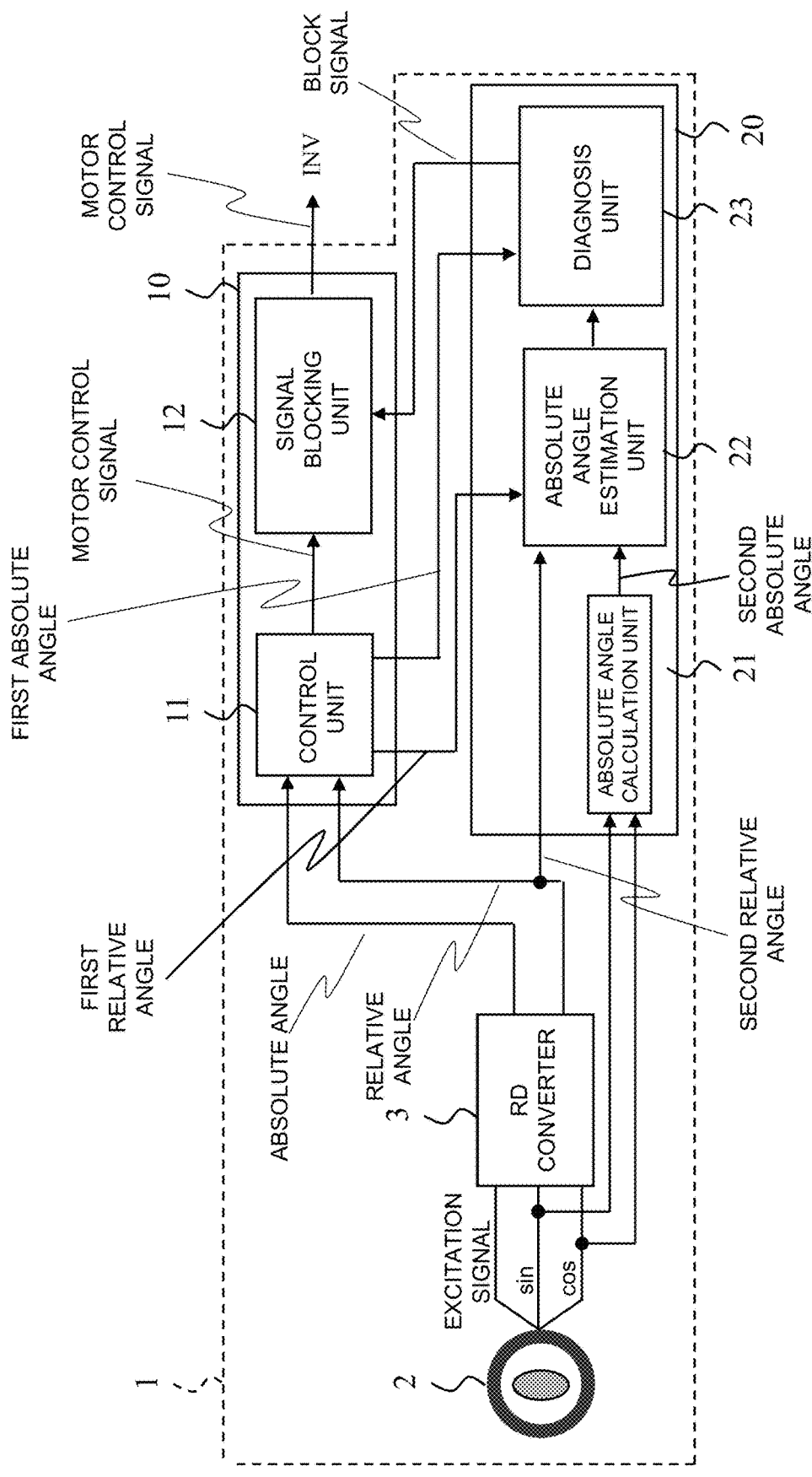
FIG. 1 is a block of a monitoring control device according to the embodiment.

FIG. 1 is a block diagram illustrating a monitoring control device 1 according to an embodiment of the present invention. The monitoring control device 1 illustrated in FIG. 1 is mounted to a vehicular drive system. The vehicular drive system is a system for driving a motor by electric power of a battery. A vehicle to which the drive system is mounted is a vehicle including a motor, such as a hybrid vehicle, a plug-in vehicle, and an electric vehicle. The motor is driven by a three-phase current supplied from an inverter (INV). The motor may function as an electric generator, and electric power generated by the motor in regeneration is supplied to the battery via the inverter.

The monitoring control device 1 includes a resolver 2, an RD converter 3, a first control device 10, and a second control device 20. The monitoring control device 1 includes a system for controlling (hereinafter referred to as a main system) for detecting a state of a rotor (rotator) included in a motor and controlling the motor via an inverter in response to a detected value, and a system for monitoring (hereinafter referred to as a monitoring system) separately from the control system. The main system is connected to the inverter from the resolver 2 via the RD converter 3 and the first control device 10, and is configured of a signal line through which an analog signal output from the resolver 2, an angle signal (encoder signal) converted from the analog signal by the RD converter 3, and a motor control signal pass. The monitoring system is disposed to obtain the output signal of the resolver 2 by another system different from the main system, and determine whether a detection failure has occurred in the main system or not.

The resolver 2 is mechanically connected to the rotor included in the motor. The resolver 2 is a rotation sensor that detects a rotation angle of the rotor and outputs a detected value as an analog value. The resolver 2 outputs the rotation angle of the rotor as a two-phase AC voltage (analog signal) modulated by a sine wave and a cosine wave using an excitation signal input from the RD converter 3 as a carrier wave.

The RD converter 3 samples the analog signal output from the resolver 2, and generates a digital signal by an AD conversion (analog-digital conversion) of the sampled voltage value. The digital signal is a two-phase (AB phase) encoder signal obtained by sampling each of the sine wave and the cosine wave included in the analog signal. The AB phase digital signal includes information on a relative angle of the rotor. The RD converter 3 calculates an absolute angle of the rotor based on the detected value of the resolver 2. The absolute angle is a value indicating an absolute position of the rotor from a reference position with an angle. The relative angle indicates how much the rotor has moved before and after the moving, and corresponds to an amount of rotational displacement of the rotor. The absolute angle is indicated by a code, and the relative angle is indicated by an output waveform of the AB signal. That is, the RD converter 3 calculates the absolute angle and the relative angle of the rotor based on the analog signal from the resolver, and outputs an angle signal including the absolute angle and an angle signal including the relative angle. The RD converter 3 outputs the angle signal including the absolute angle to the first control device 10, and outputs the angle signal including the relative angle to the first control device 10 and the second control device 20. Hereinafter, the absolute angle calculated by the RD converter 3 is referred to as a first absolute angle, and the relative angle calculated at the same timing as the first absolute angle is referred to as a first relative angle.

The first control device 10 obtains the first absolute angle and the first relative angle from the RD converter 3, calculates a control command value for motor control in response to the first absolute angle and the first relative angle, and outputs a motor control signal including the control command value to the inverter (INV). The first control device 10 includes a CPU and a memory such as a RAM or a ROM, and executes a program stored in the memory by the CPU, thereby executing various kinds of control functions. The first control device 10 includes a control unit 11 and a signal blocking unit 12 as function blocks. The control unit 11 has a function of obtaining the angle signal from the RD converter 3, a function of controlling the motor, a function of generating a signal for diagnosis, and the like. The control unit 11 simultaneously obtains the first absolute angle and the first relative angle. Then, the control unit 11 computes a current angular velocity of the motor from the first absolute angle and/or the first relative angle. The control unit 11 calculates the control command value by a PI control based on a required torque input from outside, the computed angular velocity, and the like, and outputs the motor control signal to the inverter. The control unit 11 generates a first diagnostic signal based on the first absolute angle, and outputs it to the second control device 20. The first diagnostic signal includes information on the first absolute angle used for the motor control. That is, the control unit 11 outputs the information on the rotation angle of the rotor used for the motor control to the second control device 20 for the diagnosis. The control unit 11 generates a signal based on the first relative angle, and outputs it to the second control device 20. The control unit 11 may directly output the angle signal that is input from the RD converter 3 and includes the first absolute angle to the second control device 20 as the first diagnostic signal. The control unit 11 may directly output the angle signal that is input from the RD converter 3 and includes the second absolute angle to the second control device 20.

The signal blocking unit 12 blocks the motor control signal output from the first control device 10 to the inverter in response to a block signal transmitted from a diagnosis unit 23 described later. The block signal is output from the diagnosis unit 23 when a detection failure of the rotation state of the rotor is diagnosed to be present. When the block signal is received from the diagnosis unit 23, the signal blocking unit 12 blocks the motor control signal generated by the control unit 11. When the motor control signal is blocked, the signal blocking unit 12 may determine that a failure is present in the detection of the rotation state of the rotor, and may perform fail-safe control of, for example stopping the motor control or issue an outside warning or the like. When the block signal is not received from the diagnosis unit 23, the signal blocking unit 12 outputs the motor control signal generated by the control unit 11 to the inverter without blocking it.

The second control device 20 obtains the analog signal from the resolver, calculates the second absolute angle based on the analog signal, generates a second diagnostic signal based on the second absolute angle, and compares the first diagnostic signal with the second diagnostic signal to diagnose the presence/absence of the detection failure of the rotation state of the rotor. The second control device 20 includes a CPU and a memory such as a RAM or a ROM, and executes a program stored in the memory by the CPU, thereby executing various kinds of control functions. The second control device 20 includes the CPU different from the CPU included in the first control device 10. The second control device 20 includes an absolute angle calculation unit 21, an absolute angle estimation unit 22, and a diagnosis unit 23 as function blocks.

The absolute angle calculation unit 21 specifies a sine function (sin θ) and a cosine function (cos θ) representing the rotation angle from the analog signal output from the resolver 2, and takes an arctangent (arctan [sin θ/cos θ]), thereby calculating the absolute angle of the rotor. The calculation timing of the absolute angle in the absolute angle calculation unit 21 is a timing different from that of the first absolute angle calculated by the AD conversion in the RD converter 3. That is, the calculation timing of the absolute angle calculation unit 21 is not synchronized with the calculation timing of the RD converter 3, and they are different timings. Hereinafter, an absolute angle calculated by the absolute angle calculation unit 21 is referred to as a second absolute angle. A relative angle of the rotor obtained at the same timing as the calculation timing of the second absolute angle is referred to as a second relative angle. Then, since the first absolute angle is not calculated at the same timing (the same time) with the second absolute angle, a time difference is generated between the first absolute angle and the second absolute angle. The absolute angle calculation unit 21 generates the second diagnostic signal based on the second absolute angle, and outputs it to the absolute angle estimation unit 22. The second diagnostic signal includes information on the second absolute angle, and in other words, includes information on the rotation angle calculated at a timing different from that of the first absolute angle used for the motor control.

The absolute angle estimation unit 22 obtains the second relative angle calculated by the RD converter 3 at the same timing as the second absolute angle, and obtains the first relative angle from the control unit 11. The absolute angle estimation unit 22 estimates an estimation value of the first absolute angle based on the second absolute angle, the first relative angle, and the second relative angle using a formula (1) below.

[Math. 1]

$$\theta_{1\_e} = \theta_2 - (\Delta\theta_2 - \Delta\theta_1) \quad (1)$$

Note that, $\theta_{1\_e}$ indicates the estimation value of the first absolute angle, $\theta_2$ indicates the second absolute angle, $\Delta\theta_1$ indicates the first relative angle, and $\Delta\theta_2$ indicates the second relative angle.

The absolute angle estimation unit 22 adds information on the estimation value of the first absolute angle to the second diagnostic signal generated by the absolute angle calculation unit 21, and outputs it as the second diagnostic signal to the diagnosis unit 23. Since the estimation value of the first absolute angle is a value calculated based on the second absolute angle, the second diagnostic signal output from the absolute angle estimation unit 22 to the diagnosis unit 23 is a signal based on the second absolute angle.

The diagnosis unit 23 compares the first diagnostic signal output from the control unit 11 with the second diagnostic signal output from the absolute angle estimation unit 22, and diagnoses the presence/absence of the detection failure of the rotation state of the rotor. Specifically, the diagnosis unit 23 specifies the first absolute angle from the first diagnostic signal, specifies the estimation value of the first absolute angle from the second diagnostic signal, and calculates a difference between the first absolute angle and the estimation value of the first absolute angle. In the diagnosis unit 23, a determination threshold value for determining the detection failure is preliminarily set. The determination threshold value is set to be, for example, a value greater than a detection error. Then, when the difference between the first absolute angle and the estimation value of the first absolute angle is less than the determination threshold value, the diagnosis unit 23 determines that the absolute angle calculated by the RD converter 3 is an exact value, and diagnoses that the detection failure is not present. Meanwhile, when the difference between the first absolute angle and the estimation value of the first absolute angle is the determination threshold value or more, the diagnosis unit 23 determines that the detection failure is present. For example, when a failure occurs in the AD conversion by the RD converter 3, or when a failure occurs in a signal line of the main system or a signal line of the monitoring system, the value of the first absolute angle and/or the second absolute angle becomes an outlier. In this embodiment, the first absolute angle is obtained from the first control device 10 using the signal line of the main system, and the second absolute angle is obtained using the signal line of the monitoring system with a time difference with the first absolute angle. Then, when the detection failure has occurred, a large angle difference is generated between the first absolute angle and the second absolute angle having the time difference. In this embodiment, the detection failure is diagnosed based on a magnitude of the angle difference.

When the detection failure of the rotation state of the rotor is determined to be present, the diagnosis unit 23 outputs the block signal to the signal blocking unit 12. When the detection failure of the rotation state of the rotor is determined to be not present, the diagnosis unit 23 does not output the block signal to the signal blocking unit 12.

As described above, in this embodiment, the resolver 2 detects the rotation state of the rotor and outputs the analog signal in response to the detected rotation state, the RD converter 3 calculates the first absolute angle of the rotor at the first timing based on the analog signal and outputs the signal including the information on the first absolute angle, and the first control device 10 generates the first diagnostic signal based on the first absolute angle and outputs the first diagnostic signal to the second control device 20. Then, the second control device 20 calculates the second absolute angle of the rotor at a second timing different from the first timing based on the analog signal, generates the second diagnostic signal based on the second absolute angle, and compares the first diagnostic signal with the second diagnostic signal to diagnose the presence/absence of the detection failure of the rotation state of the rotor. Accordingly, the monitoring control device 1 or the monitoring control method according to the embodiment can diagnose the detection failure of the rotation state without need for the synchronization of the conversion timings of the analog signals. In this embodiment, when a failure has occurred in the AD conversion by the RD converter 3, and when a failure has occurred in the signal line of the main system or the signal line of the monitoring system, the failure can be detected.

Now, as a device for diagnosing the detection failure of the rotation state of the rotor, which is different from the device in this embodiment, a device below is considered. For example, a plurality of AD converters are connected to a resolver, timings of AD conversion are synchronized among the plurality of AD converters, and digital signals output from the plurality of AD converters are mutually compared, thereby diagnosing the detection failure of the rotation state of the rotor. In such a device, there is a problem that the synchronization among the plurality of AD converters is required and AD converters having high computing accuracies are necessary for the synchronization. Furthermore, there is a problem that when the three or more AD converters are to be synchronized, it is difficult to synchronize them.

Meanwhile, in this embodiment, since it is unnecessary to synchronize the conversion timings of the analog signals in the calculation of the absolute angle, the problem as described above can be solved.

In this embodiment, the first diagnostic signal includes the information on the first absolute angle, and the second diagnostic signal includes the information on the second absolute angle. This allows the diagnosis of the detection failure of the rotation state without need for the synchronization of the conversion timings of the analog signals.

In this embodiment, the RD converter calculates each of the first relative angle of the rotor at the first timing and the second relative angle of the rotor at the second timing based on the analog signal from the resolver 2, and outputs each of the signal including the information on the first relative angle and the signal including the information on the second relative angle. Then, the second control device 20 estimates the estimation value of the first absolute angle based on the second absolute angle, the first relative angle, and the second relative angle, and compares the estimation value with the first absolute angle included in the first diagnostic signal to diagnose the presence/absence of the detection failure of the rotation state of the rotor. This allows the diagnosis of the detection failure of the rotation state without need for the synchronization of the conversion timings of the analog signals.

While the absolute angle estimation unit 22 obtains the first relative angle from the control unit 11 in this embodiment, the first relative angle may be obtained from the RD converter 3. In this embodiment, the number of the monitoring systems is not limited to one, and a plurality of monitoring systems may be disposed. When a plurality of monitoring systems are disposed, the monitoring systems are formed such that a plurality of control devices the same as the second control device 20 are disposed corresponding to the monitoring systems and the signal line of the analog signal of the resolver 2 is branched to output the analog signal of the resolver 2 to each of the control devices. Then, when the block signal is received from any one of the diagnosis units 23 among the diagnosis units 23 included in the respective plurality of second control devices 20, the signal blocking unit 12 blocks the motor control signal. Accordingly, since the synchronization is not required even when a plurality of monitoring systems are disposed, a load of software processing can be reduced and the detection failure can be accurately diagnosed.

Second Embodiment

Figure 2:
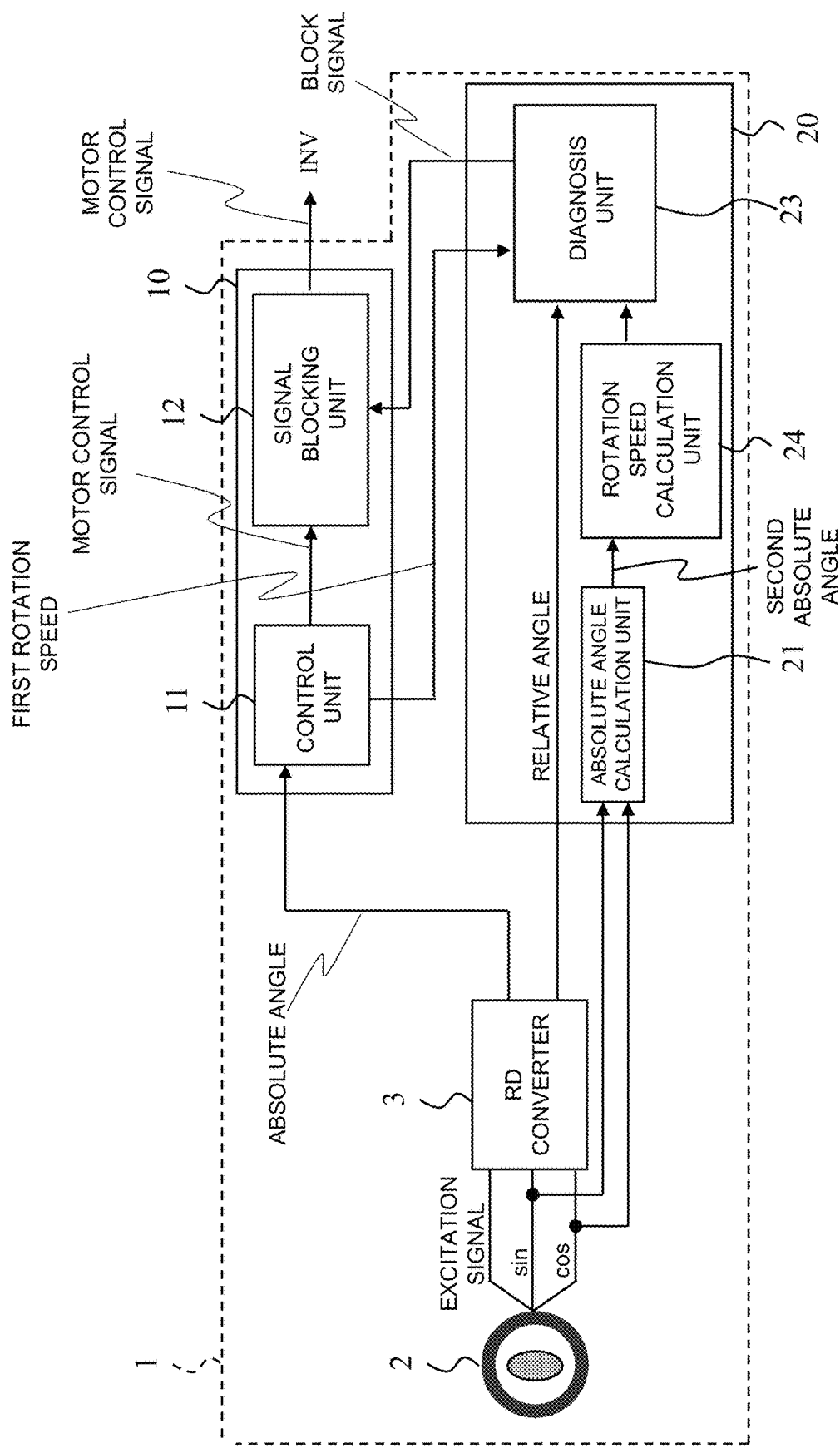
FIG. 2 is a block of a monitoring control device according to another embodiment of the present invention.

FIG. 2 is a block diagram illustrating a monitoring control device 1 according to another embodiment of the present invention. In this embodiment, a part of a control by a first control device 10 and a part of a control by a second control device 20 are different from those in the first embodiment. The configuration other than this is the same as that of the above-described first embodiment, and the explanations of the configuration and the control processing the same as those in the first embodiment are omitted in the following description, while the omitted explanations are appropriately incorporated in the descriptions of the first embodiment.

A control unit 11 included in the first control device 10 calculates a rotation speed of the rotor based on the first absolute angle. The control unit 11 obtains the first absolute angle from an RD converter 3 at a predetermined cycle, calculates a difference between a current value and a previous value of the first absolute angle, and calculates a first rotation speed of the rotor from the calculated difference of the first absolute angle. The control unit 11 generates a first diagnostic signal including information on the first rotation speed, and outputs it to a diagnosis unit 23 of the second control device 20. Since the first rotation speed is a value calculated based on the first absolute angle, the first diagnostic signal is a signal based on the first absolute angle.

The second control device 20 includes an absolute angle calculation unit 21, a rotation speed calculation unit 24, and the diagnosis unit 23. The absolute angle calculation unit 21 is similar to the absolute angle calculation unit 21 in the first embodiment. The rotation speed calculation unit 24 calculates a rotation speed of the rotor based on the second absolute angle. The rotation speed calculation unit 24 obtains the second absolute angle calculated by the absolute angle calculation unit 21 at the predetermined cycle, calculates a difference between a current value and a previous value of the second absolute angle, and calculates a second rotation speed of the rotor from the calculated difference of the second absolute angle. A calculation timing of the previous value of the first absolute angle is different from a calculation timing of the previous value of the second absolute angle, and a calculation timing of the current value of the first absolute angle is different from a calculation timing of the current value of the second absolute angle. The calculation timing of the first absolute angle is the calculation timing in the RD converter 3, and the calculation timing of the second absolute angle is the calculation timing in the absolute angle calculation unit 21.

The rotation speed calculation unit 24 generates a second diagnostic signal including information on the second rotation speed, and outputs the second diagnostic signal to the diagnosis unit 23. Since the second rotation speed is a value calculated based on the second absolute angle, the second diagnostic signal is a signal based on the second absolute angle.

The diagnosis unit 23 compares the first diagnostic signal output from the control unit 11 with the second diagnostic signal output from the rotation speed calculation unit 24, and diagnoses the presence/absence of the detection failure of the rotation state of the rotor. Specifically, the diagnosis unit 23 specifies the first rotation speed from the first diagnostic signal, specifies the second rotation speed from the second diagnostic signal, and calculates a difference between the first rotation speed and the second rotation speed. In the diagnosis unit 23, a determination threshold value for determining the detection failure is preliminarily set. The determination threshold value is set to be, for example, a value greater than a detection error. The determination threshold value is indicated by the rotation speed differently from the first embodiment. Then, when the difference between the first rotation speed and the second rotation speed is less than the determination threshold value, the diagnosis unit 23 determines that the rotation speed calculated by the RD converter 3 is an exact value, and diagnoses that the detection failure is not present. Meanwhile, when the difference between the first rotation speed and the second rotation speed is the determination threshold value or more, the diagnosis unit 23 determines that the detection failure is present. In this embodiment, the first rotation speed is obtained from the first control device 10 using the signal line of the main system, and the second rotation speed is obtained using the signal line of the monitoring system with a time difference with the first rotation speed. Then, when the detection failure has occurred, a large difference in rotation speed is generated between the first rotation speed and the second rotation speed having the time difference. In this embodiment, the detection failure is diagnosed based on a magnitude of the rotation speed difference.

The diagnosis unit 23 obtains the first relative angle and the second relative angle calculated by the RD converter 3, calculates a difference between the first relative angle and the second relative angle, and calculates an amount of variation of the rotation speed of the rotor from the calculated difference. In the diagnosis unit 23, a variation determination threshold value for determining the variation of the rotor rotation speed is preliminarily set. The diagnosis unit 23 compares the calculated amount of variation of the rotation speed with the variation determination threshold value, and when the calculated amount of variation of the rotation speed is the variation determination threshold value or more, the diagnosis unit 23 determines that the rotation speed has varied. Then, when the rotation speed is determined to have varied, the diagnosis unit 23 stops the diagnosis of the detection failure of the rotation state based on the difference between the first rotation speed and the second rotation speed. For example, when the rotation speed of the rotor has varied due to a torque request from outside or the like, whether the difference between the first rotation speed and the second rotation speed is due to the variation of the rotation speed or due to the detection failure cannot be determined. Therefore, when the variation of the rotation speed is large, the diagnosis of the detection failure of the rotation state is stopped. On the other hand, when the calculated amount of variation of the rotation speed is less than the variation determination threshold value, the diagnosis unit 23 determines that the rotation speed has not varied or the variation of the rotation speed is small, and the diagnosis unit 23 continues the diagnosis of the detection failure of the rotation state.

When the detection failure of the rotation state of the rotor is determined to be present, the diagnosis unit 23 outputs a block signal to the signal blocking unit 12. When the detection failure of the rotation state of the rotor is determined to be not present, the diagnosis unit 23 does not output the block signal to the signal blocking unit 12.

As described above, in this embodiment, the first control device 10 calculates the first rotation speed of the rotor based on the first absolute angle and generates the first diagnostic signal including the information on the first rotation speed, and the second control device 20 calculates the second rotation speed of the rotor based on the second absolute angle, generates the second diagnostic signal including the information on the second rotation speed, and compares the first rotation speed with the second rotation speed to diagnose the presence/absence of the detection failure of the rotation state. This allows the diagnosis of the detection failure of the rotation state without need for the synchronization of the conversion timings of the analog signals. In this embodiment, when a failure has occurred in the AD conversion by the RD converter 3, and when a failure has occurred in the signal line of the main system or the signal line of the monitoring system, the failure can be detected.

In this embodiment, the RD converter 3 calculates the relative angle of the rotor based on the analog signal and outputs the signal including the relative angle, and the second control device 20 calculates the amount of variation of the rotation speed of the rotor based on the relative angle, and stops the diagnosis of the presence/absence of the detection failure of the rotation state when the amount of variation is the predetermined threshold value (variation determination threshold value) or more. This allows avoiding a false detection when the rotation speed varies.

In this embodiment, the number of the monitoring systems is not limited to one, and a plurality of monitoring systems may be disposed. When a plurality of monitoring systems are disposed, the monitoring systems are formed such that control devices the same as the second control device 20 are disposed corresponding to the monitoring systems and the signal line of the analog signal of the resolver 2 is branched to output the analog signal of the resolver 2 to each of the control devices. Then, when the block signal is received from any one of the diagnosis units 23 among the diagnosis units 23 included in the respective plurality of second control devices, the signal blocking unit 12 blocks the motor control signal. Accordingly, since the synchronization is not required even when a plurality of monitoring systems are disposed, a load of software processing can be reduced and the detection failure can be accurately diagnosed.

Figure 3:
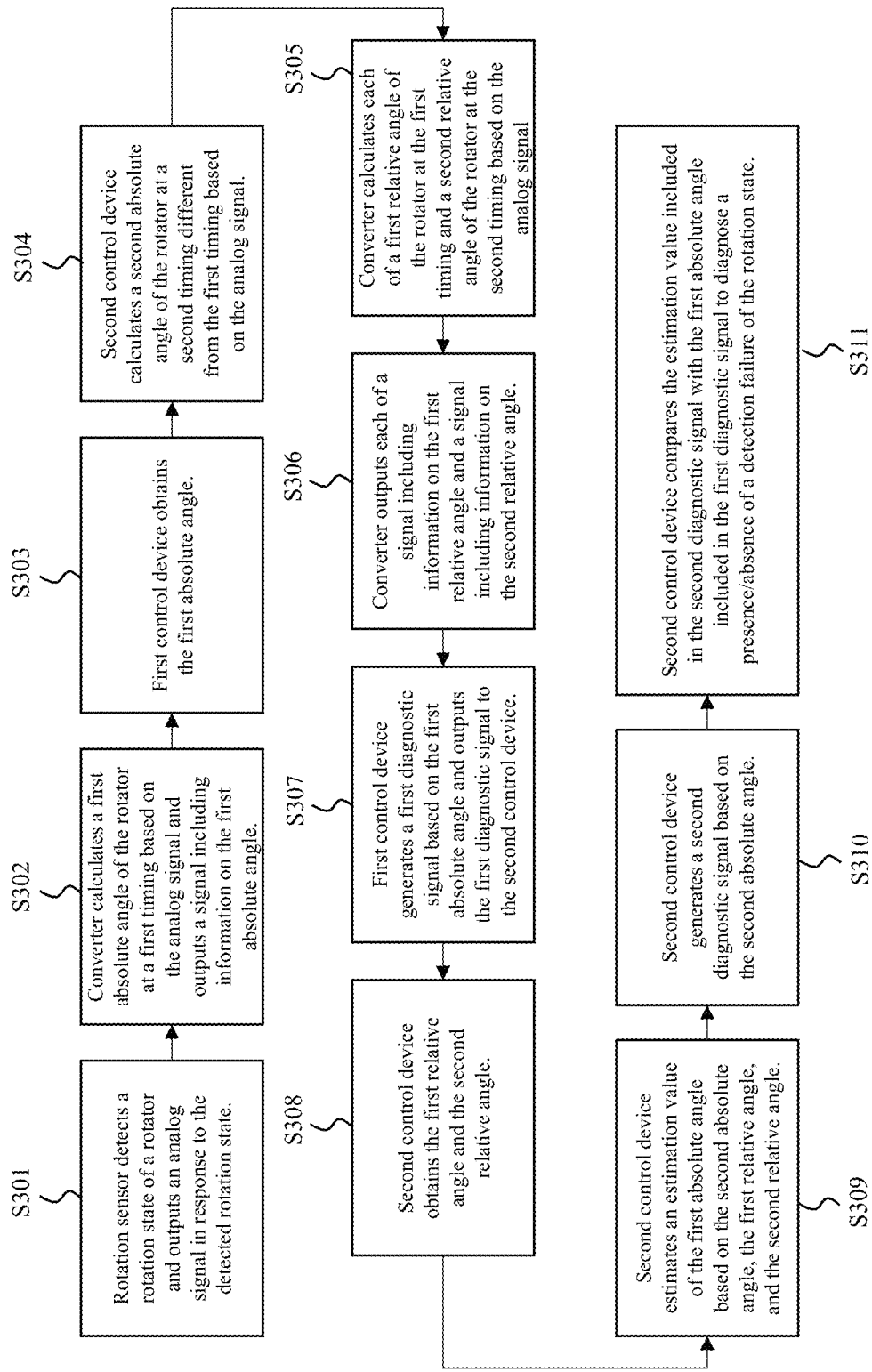
FIG. 3 is a flow chart showing steps performed by a system according to an embodiment.

FIG. 3 is a flowchart showing steps performed by a monitoring control device according to a first embodiment. The steps include: Step 301 in which a rotation sensor detects a rotation state of a rotator and outputs an analog signal in response to the detected rotation state; Step 302 in which a converter calculates a first absolute angle of the rotator at a first timing based on the analog signal and outputs a signal including information on the first absolute angle; Step 303 in which a first control device obtains the first absolute angle; Step 304 in which a second control device calculates a second absolute angle of the rotator at a second timing different from the first timing based on the analog signal; Step 305 in which a converter calculates each of a first relative angle of the rotator at the first timing and a second relative angle of the rotator at the second timing based on the analog signal; Step 306 in which a converter outputs each of a signal including information on the first relative angle and a signal including information on the second relative angle; Step 307 in which a first control device generates a first diagnostic signal based on the first absolute angle and outputs the first diagnostic signal to the second control device; Step 308 in which a second control device obtains the first relative angle and the second relative angle; Step 309 in which a second control device estimates an estimation value of the first absolute angle based on the second absolute angle, the first relative angle, and the second relative angle; Step 310 in which a second control device generates a second diagnostic signal based on the second absolute angle; and Step 311 in which a second control device compares the estimation value included in the second diagnostic signal with the first absolute angle included in the first diagnostic signal to diagnose a presence/absence of a detection failure of the rotation state.

Figure 4:
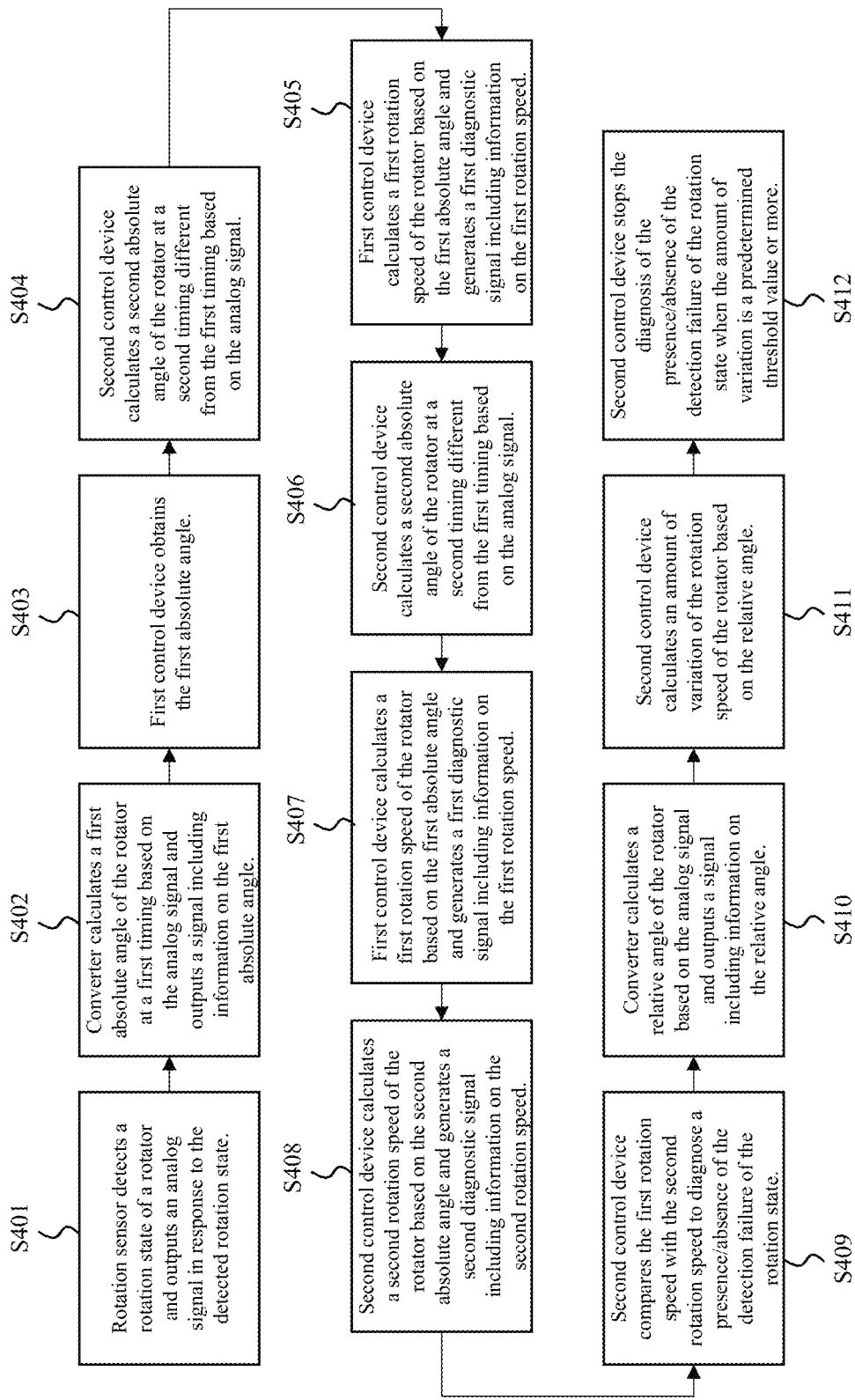
FIG. 4 is a flow chart showing steps performed by a system according to another embodiment.

FIG. 4 is a flowchart showing steps performed by a monitoring control device according to a second embodiment. The steps include: Step 401 in which a rotation sensor detects a rotation state of a rotator and outputs an analog signal in response to the detected rotation state; Step 402 in which a converter calculates a first absolute angle of the rotator at a first timing based on the analog signal and outputs a signal including information on the first absolute angle; Step 403 in which a first control device obtains the first absolute angle; Step 404 in which a second control device calculates a second absolute angle of the rotator at a second timing different from the first timing based on the analog signal; Step 405 in which a first control device calculates a first rotation speed of the rotator based on the first absolute angle and generates a first diagnostic signal including information on the first rotation speed; Step 406 in which a second control device calculates a second absolute angle of the rotator at a second timing different from the first timing based on the analog signal; Step 407 in which a first control device calculates a first rotation speed of the rotator based on the first absolute angle and generates a first diagnostic signal including information on the first rotation speed; Step 408 in which a second control device calculates a second rotation speed of the rotator based on the second absolute angle and generates a second diagnostic signal including information on the second rotation speed; Step 409 in which a second control device compares the first rotation speed with the second rotation speed to diagnose a presence/absence of the detection failure of the rotation state; Step 410 in which a converter calculates a relative angle of the rotator based on the analog signal and outputs a signal including information on the relative angle; Step 411 in which a second control device calculates an amount of variation of the rotation speed of the rotator based on the relative angle; and Step 412 in which a second control device stops the diagnosis of the presence/absence of the detection failure of the rotation state when the amount of variation is a predetermined threshold value or more.

Figure 5:
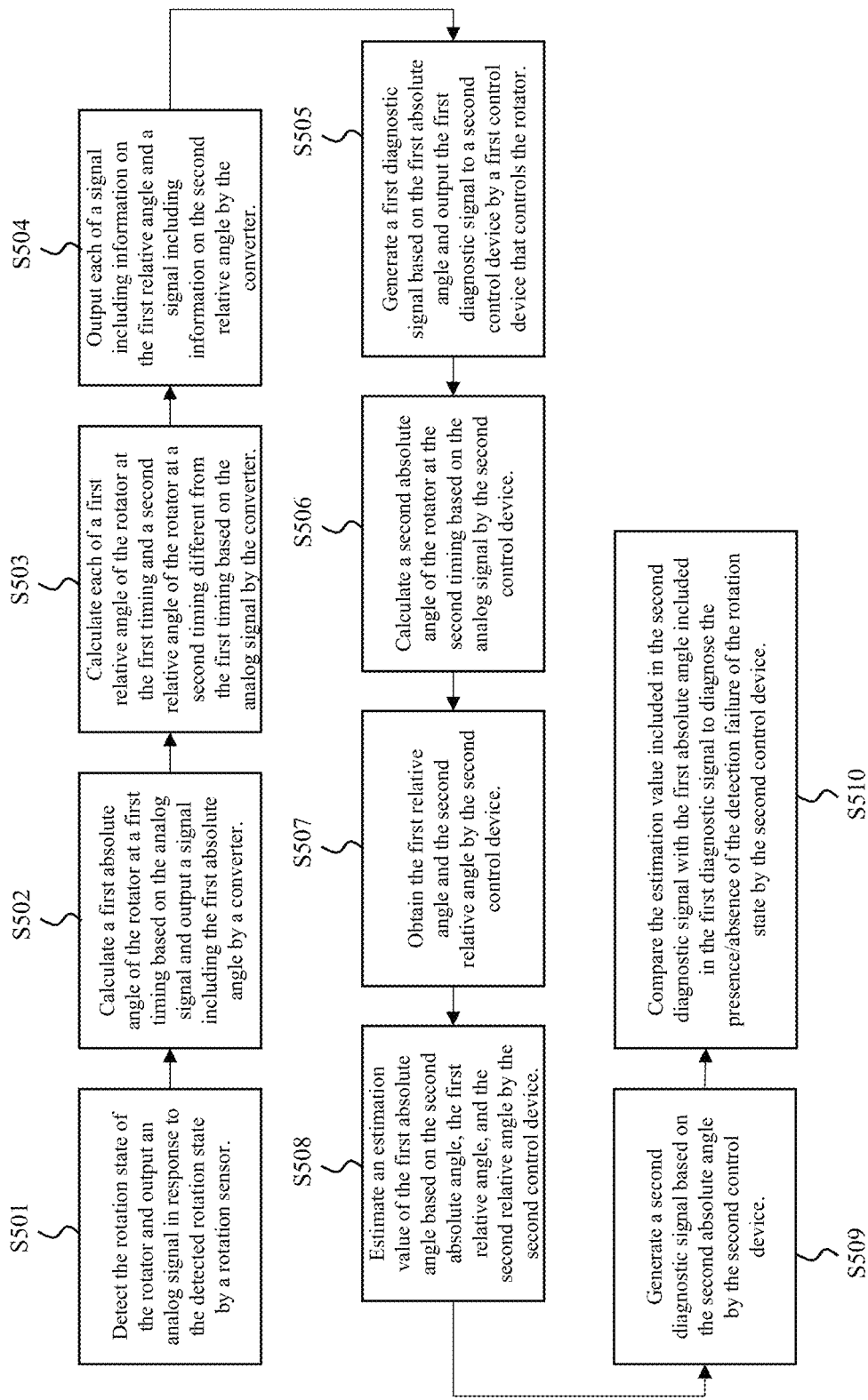
FIG. 5 is a flow chart showing steps of a method according to another embodiment.

FIG. 5 is a flowchart showing steps of a monitoring control method for diagnosing a presence/absence of a detection failure of a rotation state of a rotator according to a third embodiment. The steps include: Step 501 in which the method detects the rotation state of the rotator and outputs an analog signal in response to the detected rotation state by a rotation sensor; Step 502 in which the method calculates a first absolute angle of the rotator at a first timing based on the analog signal and outputs a signal including the first absolute angle by a converter; Step 503 in which the method calculates each of a first relative angle of the rotator at the first timing and a second relative angle of the rotator at a second timing different from the first timing based on the analog signal by the converter; Step 504 in which the method outputs each of a signal including information on the first relative angle and a signal including information on the second relative angle by the converter; Step 505 in which the method generates a first diagnostic signal based on the first absolute angle and outputs the first diagnostic signal to a second control device by a first control device that controls the rotator; Step 506 in which the method calculates a second absolute angle of the rotator at the second timing based on the analog signal by the second control device; Step 507 in which the method obtains the first relative angle and the second relative angle by the second control device; Step 508 in which the method estimates an estimation value of the first absolute angle based on the second absolute angle, the first relative angle, and the second relative angle by the second control device; Step 509 in which the method generates a second diagnostic signal based on the second absolute angle by the second control device; Step 510 in which the method compares the estimation value included in the second diagnostic signal with the first absolute angle included in the first diagnostic signal to diagnose the presence/absence of the detection failure of the rotation state by the second control device.

While the embodiments of the present invention have been described above, these embodiments are described for ease of understanding the present invention, and not described to limit the present invention. Accordingly, the components disclosed in the above-described embodiments are intended to include all the changes of design and equivalents within the technical scope of the present invention.

DESCRIPTION OF REFERENCE SIGNS

1 . . . monitoring control device
2 . . . resolver
3 . . . converter
10 . . . first control device
11 . . . control unit
12 . . . signal blocking unit
20 . . . second control device
21 . . . absolute angle calculation unit
22 . . . absolute angle estimation unit
23 . . . diagnosis unit
24 . . . rotation speed calculation unit

The invention claimed is:

1. A monitoring control device comprising:
a rotation sensor that detects a rotation state of a rotator and outputs an analog signal in response to the detected rotation state;
a converter that calculates a first absolute angle of the rotator at a first timing based on the analog signal and outputs a signal including information on the first absolute angle;
a first control device that obtains the first absolute angle; and
a second control device that calculates a second absolute angle of the rotator at a second timing different from the first timing based on the analog signal, wherein:
the converter is configured to:
  calculate each of a first relative angle of the rotator at the first timing and a second relative angle of the rotator at the second timing based on the analog signal, and
  output each of a signal including information on the first relative angle and a signal including information on the second relative angle;
the first control device is configured to generate a first diagnostic signal based on the first absolute angle, and output the first diagnostic signal to the second control device; and the second control device is configured to:
  obtain the first relative angle and the second relative angle,
  estimate an estimation value of the first absolute angle based on the second absolute angle, the first relative angle, and the second relative angle,
  generate a second diagnostic signal based on the second absolute angle, and
  compare the estimation value included in the second diagnostic signal with the first absolute angle included in the first diagnostic signal to diagnose a presence/absence of a detection failure of the rotation state.

2. The monitoring control device according to claim 1, wherein:
the first diagnostic signal includes the information on the first absolute angle, and
the second diagnostic signal includes information on the second absolute angle.

3. The monitoring control device according to claim 1, wherein:
the first control device calculates a first rotation speed of the rotator based on the first absolute angle and generates the first diagnostic signal including information on the first rotation speed,
the second control device calculates a second rotation speed of the rotator based on the second absolute angle and generates the second diagnostic signal including information on the second rotation speed, and
the second control device compares the first rotation speed with the second rotation speed to diagnose the presence/absence of the detection failure of the rotation state.

4. A monitoring control device comprising:
a rotation sensor configured to detect a rotation state of a rotator and outputs an analog signal in response to the detected rotation state;
a converter configured to calculate a first absolute angle of the rotator at a first timing based on the analog signal and outputs a signal including information on the first absolute angle;
a first control device configured to obtain the first absolute angle; and
a second control device configured to calculate a second absolute angle of the rotator at a second timing different from the first timing based on the analog signal, wherein:
the first control device is configured to calculate a first rotation speed of the rotator based on the first absolute angle, and generate a first diagnostic signal including information on the first rotation speed,
the second control device is configured to calculate a second rotation speed of the rotator based on the second absolute angle, and generate a second diagnostic signal including information on the second rotation speed,
the second control device is configured to compare the first rotation speed with the second rotation speed to diagnose a presence/absence of the detection failure of the rotation state,
the converter is configured to calculate a relative angle of the rotator based on the analog signal and outputs a signal including information on the relative angle,
the second control device is configured to calculate an amount of variation of the rotation speed of the rotator based on the relative angle, and
the second control device is configured to stop the diagnosis of the presence/absence of the detection failure of the rotation state when the amount of variation is a predetermined threshold value or more.

5. A monitoring control method for diagnosing a presence/absence of a detection failure of a rotation state of a rotator, the method comprising:

detecting the rotation state of the rotator and outputting an analog signal in response to the detected rotation state by a rotation sensor;

calculating a first absolute angle of the rotator at a first timing based on the analog signal and outputting a signal including the first absolute angle by a converter;

calculating each of a first relative angle of the rotator at the first timing and a second relative angle of the rotator at a second timing different from the first timing based on the analog signal by the converter;

outputting each of a signal including information on the first relative angle and a signal including information on the second relative angle by the converter;

generating a first diagnostic signal based on the first absolute angle and outputting the first diagnostic signal to a second control device by a first control device that controls the rotator;

calculating a second absolute angle of the rotator at the second timing based on the analog signal by the second control device;

obtaining the first relative angle and the second relative angle by the second control device;

estimating an estimation value of the first absolute angle based on the second absolute angle, the first relative angle, and the second relative angle by the second control device;

generating a second diagnostic signal based on the second absolute angle by the second control device; and comparing the estimation value included in the second diagnostic signal with the first absolute angle included in the first diagnostic signal to diagnose the presence/absence of the detection failure of the rotation state by the second control device.

* * * * *